(12) United States Patent
Sali et al.

(10) Patent No.: US 8,717,417 B2
(45) Date of Patent: May 6, 2014

(54) THREE-DIMENSIONAL MAPPING AND IMAGING

(75) Inventors: Erez Sali, Savyon (IL); Assaf Avraham, Givatayim (IL)

(73) Assignee: Primesense Ltd., Tel Aviv (IL)

( * ) Notice: Subject to any disclaimer, the term of this patent is extended or adjusted under 35 U.S.C. 154(b) by 808 days.

(21) Appl. No.: 12/758,047

(22) Filed: Apr. 12, 2010

(65) Prior Publication Data

US 2010/0265316 A1   Oct. 21, 2010

Related U.S. Application Data (60) Provisional application No. 61/169,728, filed on Apr. 16, 2009, provisional application No. 61/171,087, filed on Apr. 21, 2009.

(51) Int. Cl.
*H04N 13/02* (2006.01)

(52) U.S. Cl.
USPC .......................................... 348/46; 348/222.1

(58) Field of Classification Search
USPC ......... 348/46, 266; 345/8; 356/603; 382/118; 250/208
See application file for complete search history.

(56) References Cited

U.S. PATENT DOCUMENTS

| | | | |
|---|---|---|---|
| 4,542,376 A | 9/1985 | Bass et al. | |
| 4,802,759 A | 2/1989 | Matsumoto | |
| 4,843,568 A | 6/1989 | Krueger et al. | |
| 5,075,562 A | 12/1991 | Greivenkamp et al. | |
| 5,483,261 A | 1/1996 | Yasutake | |
| 5,630,043 A | 5/1997 | Uhlin | |
| 5,636,025 A | 6/1997 | Bieman et al. | |
| 5,838,428 A | 11/1998 | Pipitone et al. | |
| 5,856,871 A | 1/1999 | Cabib et al. | |
| 5,909,312 A | 6/1999 | Mendlovic et al. | |
| 6,099,134 A | 8/2000 | Taniguchi et al. | |
| 6,100,517 A | 8/2000 | Yahav et al. | |
| 6,101,269 A | 8/2000 | Hunter et al. | |
| 6,167,151 A | 12/2000 | Albeck | |

(Continued)

FOREIGN PATENT DOCUMENTS

| | | |
|---|---|---|
| DE | 19736169 A1 | 8/1997 |
| DE | 19638727 A1 | 3/1998 |

(Continued)

OTHER PUBLICATIONS

Hart, D., U.S. Appl. No. 09/616,606 "Method and System for High Resolution, Ultra Fast 3-D Imaging" filed Jul. 14, 2000.

(Continued)

*Primary Examiner* — William C Vaughn, Jr.
*Assistant Examiner* — Naod Belai
(74) *Attorney, Agent, or Firm* — D. Kligler IP Services Ltd.

(57) ABSTRACT

Imaging apparatus includes an illumination subassembly, which is configured to project onto an object a pattern of monochromatic optical radiation in a given wavelength band. An imaging subassembly includes an image sensor, which is configured both to capture a first, monochromatic image of the pattern on the object by receiving the monochromatic optical radiation reflected from the object and to capture a second, color image of the object by receiving polychromatic optical radiation, and to output first and second image signals responsively to the first and second images, respectively. A processor is configured to process the first and second signals so as to generate and output a depth map of the object in registration with the color image.

6 Claims, 2 Drawing Sheets

(56) References Cited

U.S. PATENT DOCUMENTS

| | | | |
|---|---|---|---|
| 6,259,561 B1 | 7/2001 | George et al. | |
| 6,262,740 B1 | 7/2001 | Lauer et al. | |
| 6,377,700 B1 | 4/2002 | Mack et al. | |
| 6,438,263 B2 | 8/2002 | Albeck et al. | |
| 6,686,921 B1 | 2/2004 | Rushmeier et al. | |
| 6,700,669 B1 | 3/2004 | Geng | |
| 6,741,251 B2 | 5/2004 | Malzbender | |
| 6,751,344 B1 | 6/2004 | Grumbine | |
| 6,754,370 B1 | 6/2004 | Hall-Holt et al. | |
| 6,803,777 B2 | 10/2004 | Pfaff et al. | |
| 6,810,135 B1 * | 10/2004 | Berenz et al. | 382/118 |
| 6,813,440 B1 | 11/2004 | Yu et al. | |
| 6,825,985 B2 | 11/2004 | Brown et al. | |
| 6,937,348 B2 | 8/2005 | Geng | |
| 7,009,742 B2 | 3/2006 | Brotherton-Ratcliffe et al. | |
| 7,013,040 B2 | 3/2006 | Shiratani | |
| 7,076,024 B2 | 7/2006 | Yokhin | |
| 7,112,774 B2 | 9/2006 | Baer | |
| 7,120,228 B2 | 10/2006 | Yokhin et al. | |
| 7,127,101 B2 | 10/2006 | Littlefield et al. | |
| 7,335,898 B2 | 2/2008 | Donders et al. | |
| 7,369,685 B2 | 5/2008 | DeLean | |
| 7,385,708 B2 * | 6/2008 | Ackerman et al. | 356/603 |
| 7,433,024 B2 | 10/2008 | Garcia et al. | |
| 7,551,719 B2 | 6/2009 | Yokhin et al. | |
| 7,560,679 B1 * | 7/2009 | Gutierrez | 250/208.1 |
| 7,700,904 B2 | 4/2010 | Toyoda et al. | |
| 7,811,825 B2 | 10/2010 | Fauver et al. | |
| 8,126,261 B2 | 2/2012 | Medioni et al. | |
| 8,326,025 B2 | 12/2012 | Boughorbel | |
| 2002/0075456 A1 | 6/2002 | Shiratani | |
| 2003/0057972 A1 | 3/2003 | Pfaff et al. | |
| 2003/0156756 A1 | 8/2003 | Gokturk et al. | |
| 2004/0063235 A1 | 4/2004 | Chang | |
| 2004/0105580 A1 | 6/2004 | Hager et al. | |
| 2004/0130730 A1 | 7/2004 | Cantin et al. | |
| 2004/0174770 A1 | 9/2004 | Rees | |
| 2004/0213463 A1 | 10/2004 | Morrison | |
| 2004/0218262 A1 | 11/2004 | Chuang et al. | |
| 2004/0228519 A1 | 11/2004 | Littlefield et al. | |
| 2004/0264764 A1 | 12/2004 | Kochi et al. | |
| 2005/0018209 A1 | 1/2005 | Lemelin et al. | |
| 2005/0052637 A1 | 3/2005 | Shaw et al. | |
| 2005/0111705 A1 | 5/2005 | Waupotitsch et al. | |
| 2005/0134582 A1 | 6/2005 | Claus et al. | |
| 2005/0135555 A1 | 6/2005 | Claus et al. | |
| 2005/0200925 A1 | 9/2005 | Brotherton-Ratcliffe et al. | |
| 2005/0271279 A1 | 12/2005 | Fujimura et al. | |
| 2006/0017656 A1 * | 1/2006 | Miyahara | 345/8 |
| 2006/0072851 A1 | 4/2006 | Kang et al. | |
| 2006/0156756 A1 | 7/2006 | Becke | |
| 2006/0221218 A1 * | 10/2006 | Adler et al. | 348/266 |
| 2006/0221250 A1 | 10/2006 | Rossbach et al. | |
| 2007/0057946 A1 | 3/2007 | Albeck et al. | |
| 2007/0060336 A1 | 3/2007 | Marks et al. | |
| 2007/0133840 A1 | 6/2007 | Cilia | |
| 2007/0262985 A1 | 11/2007 | Watanabe et al. | |
| 2008/0018595 A1 | 1/2008 | Hildreth et al. | |
| 2008/0037829 A1 | 2/2008 | Givon | |
| 2008/0106746 A1 | 5/2008 | Shpunt et al. | |
| 2008/0118143 A1 | 5/2008 | Gordon et al. | |
| 2008/0240502 A1 | 10/2008 | Freedman et al. | |
| 2008/0285827 A1 | 11/2008 | Meyer et al. | |
| 2009/0046152 A1 | 2/2009 | Aman | |
| 2009/0060307 A1 | 3/2009 | Ghanem et al. | |
| 2009/0096783 A1 | 4/2009 | Shpunt et al. | |
| 2009/0183125 A1 | 7/2009 | Magal et al. | |
| 2009/0183152 A1 | 7/2009 | Yang et al. | |
| 2009/0185274 A1 | 7/2009 | Shpunt | |
| 2009/0226079 A1 | 9/2009 | Katz et al. | |
| 2009/0244309 A1 | 10/2009 | Maison et al. | |
| 2010/0007717 A1 | 1/2010 | Spektor et al. | |
| 2010/0020078 A1 | 1/2010 | Shpunt | |
| 2010/0118123 A1 | 5/2010 | Freedman et al. | |
| 2010/0177164 A1 | 7/2010 | Zalevsky | |
| 2010/0182406 A1 | 7/2010 | Benitez | |
| 2010/0201811 A1 | 8/2010 | Garcia et al. | |
| 2010/0225746 A1 | 9/2010 | Shpunt et al. | |
| 2010/0265316 A1 | 10/2010 | Sali et al. | |
| 2010/0278384 A1 | 11/2010 | Shotton et al. | |
| 2010/0284082 A1 | 11/2010 | Shpunt et al. | |
| 2010/0290698 A1 | 11/2010 | Shpunt et al. | |
| 2010/0303289 A1 | 12/2010 | Polzin et al. | |
| 2011/0001799 A1 | 1/2011 | Rothenberger et al. | |
| 2011/0025827 A1 | 2/2011 | Shpunt et al. | |
| 2011/0043403 A1 | 2/2011 | Loffler | |
| 2011/0074932 A1 | 3/2011 | Gharib et al. | |
| 2011/0096182 A1 | 4/2011 | Cohen et al. | |
| 2011/0134114 A1 | 6/2011 | Rais et al. | |
| 2011/0158508 A1 | 6/2011 | Shpunt et al. | |
| 2011/0211044 A1 | 9/2011 | Shpunt et al. | |
| 2011/0285910 A1 | 11/2011 | Bamji et al. | |
| 2011/0310125 A1 | 12/2011 | McEldowney et al. | |
| 2012/0051588 A1 | 3/2012 | Mceldowney | |

FOREIGN PATENT DOCUMENTS

| | | |
|---|---|---|
| GB | 2352901 A | 2/2001 |
| JP | 62206684 A | 9/1987 |
| JP | 03-029806 U | 2/1991 |
| JP | H03-040591 A | 2/1991 |
| JP | H08-186845 A | 7/1996 |
| JP | H10-327433 A | 12/1998 |
| JP | 2000131040 A | 5/2000 |
| JP | 2002-152776 A | 5/2002 |
| JP | 2002-213931 A | 7/2002 |
| JP | 2002-365023 A | 12/2002 |
| JP | 2006-128818 A | 5/2006 |
| WO | 9303579 A1 | 2/1993 |
| WO | 9827514 A2 | 6/1998 |
| WO | 9828593 A1 | 7/1998 |
| WO | 2005010825 A2 | 2/2005 |
| WO | 2007043036 A1 | 4/2007 |
| WO | 2007096893 A2 | 8/2007 |
| WO | 2007105205 A2 | 9/2007 |
| WO | 2007105215 A2 | 9/2007 |
| WO | 2008120217 A2 | 10/2008 |

OTHER PUBLICATIONS

International Application PCT/IL2007/000306 Search Report dated Oct. 2, 2008.

International Application PCT/IL20027/000262 Search Report dated Oct. 16, 2008.

International Application PCT/IL2008/000458 Search Report dated Oct. 28, 2008.

International Application PCT/IL2007/000327 Search Report dated Sep. 26, 2008.

Takeda et al., "Fourier Transform Methods of Fringe-Pattern Analysis for Computer-Based Topography and Interferometry", Journal of Optical Society of America, vol. 72, No. 1, Jan. 1982.

Sazbon et al., "Qualitative real-time range extraction for preplanned scene partitioning using laser beam coding", Pattern Recognition Letters 26, pp. 1772-1781, year 2005.

Sjodahl et al., "Measurement of shape by using projected random and patterns and temporal digital speckle photography", Applied Optics, vol. 38, No. 10, Apr. 1, 1999.

Garcia et al., "Three dimensional mapping and range measurement by means of projected speckle patterns", Applied Optics, vol. 47, No. 16, Jun. 1, 2008.

Chen et al., "Measuring of a Three-Dimensional Surface by Use of a Spatial Distance Computation", Applied Optics, vol. 42, issue 11, pp. 1958-1972, 2003.

Ypsilos et al., "Speech-driven Face Synthesis from 3D Video", 2nd International Symposium on 3D Processing, Visualization and Transmission, Thessaloniki, Greece, Sep. 6-9, 2004.

Hanson et al. "Optics and Fluid Dynamics Department", Annual Progress Report for 1997 (an abstract).

International Application PCT/IL2006/000335 Preliminary Report on Patentability dated Apr. 24, 2008.

(56) References Cited

OTHER PUBLICATIONS

International Application PCT/IL2008/000095 Search Report dated Jul. 24, 2008.
International Application PCT/IL2009/000285 Search Report dated Jun. 11, 2009.
Goodman, J.W., "Statistical Properties of Laser Speckle Patterns", Laser Speckle and Related Phenomena, pp. 9-75, Springer-Verlag, Berlin Heidelberg, 1975.
Doty, J.L., "Projection Moire for Remote Contour Analysis", Journal of Optical Society of America, vol. 73, No. 3, pp. 366-372, Mar. 1983.
Avidan et al., "Trajectory triangulation: 3D reconstruction of moving points from amonocular image sequence", IEEE Transactions on Pattern Analysis and Machine Intelligence, vol. 22, No. 4, pages, Apr. 2000.
Leclerc et al., "The direct computation of height from shading", Proceedings of Computer Vision and Pattern Recognition, pp. 552-558, year 1991.
Zhang et al., "Shape from intensity gradient", IEEE Transactions on Systems, Man and Cybernetics—Part A: Systems and Humans, vol. 29, No. 3, pp. 318-325, May 1999.
Zhang et al., "Height recovery from intensity gradients", Proceedings of IEEE Computer Society Conference on Computer Vision and Pattern Recognition, pp. 508-513, year 1994.
Horn, B., "Height and gradient from shading", International Journal of Computer Vision, No. 5, pp. 37-76, year 1990.
Bruckstein, A., "On shape from shading", Computer Vision, Graphics, and Image Processing, vol. 44, pp. 139-154, year 1988.
Zhang et al., "Rapid Shape Acquisition Using Color Structured Light and Multi-Pass Dynamic Programming", 1st International Symposium on 3D Data Processing Visualization and Transmission (3DPVT), Padova, Italy, Jul. 2002.
Besl, P., "Active Optical Range Imaging Sensors", Machine Vision and Applications, No. 1, pp. 127-152, USA 1988.
Horn et al., "Toward optimal structured light patterns", Proceedings of International Conference on Recent Advances in 3D Digital Imaging and Modeling, pp. 28-37, Ottawa, Canada, May 1997.
Mendlovic, et al., "Composite harmonic filters for scale, projection and shift invariant pattern recognition", Applied Optics, vol. 34, No. 2, pp. 310-316, Jan. 10, 1995.
Asada et al., "Determining Surface Orientation by Projecting a Stripe Pattern", IEEE Transactions on Pattern Analysis and Machine Intelligence, vol. 10, No. 5, year 1988.
Winkelbach et al., "Shape from Single Stripe Pattern Illumination", Luc Van Gool (Editor), (DAGM 2002) Patter Recognition, Lecture Notes in Computer Science 2449, p. 240-247, Springer 2002.
Koninckx et al., "Efficient, Active 3D Acquisition, based on a Pattern-Specific Snake", Luc Van Gool (Editor), (DAGM 2002) Pattern Recognition, Lecture Notes in Computer Science 2449, pp. 557-565, Springer 2002.
Kimmel et al., "Analyzing and synthesizing images by evolving curves with the Osher-Sethian method", International Journal of Computer Vision, 24(1), pp. 37-56 , year 1997.
Zigelman et al., "Texture mapping using surface flattening via multi-dimensional scaling", IEEE Transactions on Visualization and Computer Graphics, 8 (2), pp. 198-207, year 2002.
Dainty, J.C., "Introduction", Laser Speckle and Related Phenomena, pp. 1-7, Springer-Verlag, Berlin Heidelberg, 1975.
Ypsilos et al., "Video-rate capture of Dynamic Face Shape and Appearance", Sixth IEEE International Conference on Automatic Face and Gesture Recognition (FGR 2004), Seoul, Korea, May 17-19, 2004.
Abramson, N., "Holographic Contouring by Translation", Applied Optics Journal, vol. 15, No. 4, pp. 1018-1976, Apr. 1976.
Achan et al., "Phase Unwrapping by Minimizing Kikuchi Free Energy", IEEE International Geoscience and Remote Sensing Symposium, pp. 1738-1740, Toronto, Canada, Jun. 2002.
Theocaris et al., "Radial Gratings as Moire Gauges", Journal of Scientific Instruments (Journal of Physics E), series 2, vol. 1, year 1968.

Ben Eliezer et al., "Experimental Realization of an Imaging System with an Extended Depth of Field", Applied Optics Journal, vol. 44, No. 14, pp. 2792-2798, May 10, 2005.
Tay et al., "Grating Projection System for Surface Contour Measurement", Applied Optics Journal, vol. 44, No. 8, pp. 1393-1400, Mar. 10, 2005.
Brooks et al., "Moire Gauging Using Optical Interference Patterns", Applied Optics Journal, vol. 8, No. 5, pp. 935-940, May 1969.
Hovanesian et al., "Moire Contour-Sum Contour-Difference, and Vibration Analysis of Arbitrary Objects", Applied Optics Journal, vol. 10, No. 12, pp. 2734-2738, Dec. 1971.
Bryngdahl, O., "Characteristics of Superposed Patterns in Optics", Journal of Optical Society of America, vol. 66, No. 2, pp. 87-94, Feb. 1976.
Cohen et al., "High-Resolution X-ray Diffraction for Characterization and Monitoring of Silicon-On-Insulator Fabrication Processes", Applied Physics Journal, vol. 93, No. 1, pp. 245-250, Jan. 2003.
Chen et al., "Overview of Three-Dimensional Shape Measurement Using Optical Methods", Society of Photo-Optical Instrumentation Engineers Journal 39(1), pp. 10-22, Jan. 2000.
Takasaki, H., "Moire Topography", Applied Optics Journal, vol. 12, No. 4, pp. 845-850, Apr. 1973.
Takasaki, H., "Moire Topography", Applied Optics Journal, vol. 9, No. 6, pp. 1467-1472, Jun. 1970.
Hildebrand et al., "Multiple-Wavelength and Multiple-Source Holography Applied to Contour Generation", Journal of Optical Society of America Journal, vol. 57, No. 2, pp. 155-162, Feb. 1967.
Su et al., "Application of Modulation Measurement Profilometry to Objects with Surface Holes", Applied Optics Journal, vol. 38, No. 7, pp. 1153-1158, Mar. 1, 1999.
Lim et al., "Additive Type Moire with Computer Image Processing", Applied Optics Journal, vol. 28, No. 13, pp. 2677-2680, Jul. 1, 1989.
Hung et al., "Time-Averaged Shadow-Moire Method for Studying Vibrations", Applied Optics Journal, vol. 16, No. 6, pp. 1717-1719, Jun. 1977.
Idesawa et al., "Scanning Moire Method and Automatic Measurement of 3-D Shapes", Applied Optics Journal, vol. 16, No. 8, pp. 2152-2162, Aug. 1977.
Iizuka, K., "Divergence-Ratio Axi-Vision Camera (Divcam): A Distance Mapping Camera", Review of Scientific Instruments 77, 0451111 (2006).
Shpunt et al., U.S. Appl. No. 61/229,754 "Pattern-Based Depth Mapping with Stereoscopic Assistance" filed Jul. 30, 2009.
Luxtera Inc., "Luxtera Announces World's First 10GBit CMOS Photonics Platform", Carlsbad, USA, Mar. 28, 2005 (press release).
Post et al., "Moire Methods for Engineering and Science—Moire Interferometry and Shadow Moire", Photomechanics (Topics in Applied Physics), vol. 77, pp. 151-196, Springer Berlin / Heidelberg, Jan. 1, 2000.
Piestun et al., "Wave Fields in Three Dimensions: Analysis and Synthesis", Journal of the Optical Society of America, vol. 13, No. 9, pp. 1837-1848, Sep. 1996.
Lee et al., "Variable Pulse Mode Driving IR Source Based 3D Robotic Camera", MVA2005 IAPR Conference on Machine Vision Applications, pp. 530-533, Japan, May 16-18, 2005.
Mordohai et al., "Tensor Voting: A Perceptual Organization Approach to Computer Vision and Machine Learning", Synthesis Lectures on Image, Video and Multimedia Processing, issue No. 8, Publishers Morgan and Claypool, year 2006.
Beraldin et al., "Active 3D Sensing", Scuola Normale Superiore Pisa, vol. 10, pp. 22-46, Apr. 2000.
Bhat et al., "Ordinal Measures for Image Correspondence", IEEE Transactions on Pattern Analysis and Machine Intelligence, vol. 20, No. 4, pp. 415-423, Apr. 1998.
Bradley et al., "Synchronization and Rolling Shutter Compensation for Consumer Video Camera Arrays", IEEE International Workshop on Projector-Camera Systems—PROCAMS 2009 (Miami Beach, Florida, 2009).
De Piero et al., "3D Computer Vision Using Structured Light: Design Calibration and Implementation Issues", Advances in Computers, vol. 43, pp. 243-278, Academic Press 1996.

(56) References Cited

OTHER PUBLICATIONS

Hongjun et al., "Shape Measurement by Digital Speckle Temporal Sequence Correlation Method", Acta Optica Sinica Journal, vol. 21, No. 10, pp. 1208-1213, Oct. 2001.
Hongjun, D., "Digital Speckle Temporal Sequence Correlation Method and the Application in Three-Dimensional Shape Measurement", Chinese Doctoral Dissertations & Master's Theses, Full-text Database (Master) Basic Sciences, No. 1, Mar. 15, 2004.
Hsueh et al., "Real-time 3D Topography by Speckle Image Correlation", Proceedings of SPIE Conference on Input/Output and Imaging Technologies, vol. 3422, pp. 108-112, Taiwan, Jul. 1998.
Chinese Patent Application # 200780009053.8 Official Action dated Apr. 15, 2010 (with English translation).
Chinese Patent Application # 200680038004.2 Official Action dated Mar. 30, 2010 (with English translation).
Zhu et al., "Fusion of Time-of-Flight Depth and Stereo for High Accuracy Depth Maps", Proceedings of the IEEE Conference on Computer Vision and Pattern Recognition, Anchorage, USA, Jun. 24-26, 2008.
EZconn Czech A.S., "Site Presentation", Oct. 2009.
Shpunt et al., U.S. Appl. No. 12/707,678 "Reference Image Techniques for 3D sensing" filed Feb. 18, 2010.
Garcia et al., U.S. Appl. No. 12/703,794 "Depth Ranging with Moire Patterns" filed Feb. 11, 2010.
Cohen et al., U.S. Appl. No. 12/605,340 "Geometrical Calibration and Correction for Depth Sensor" filed Oct. 25, 2009.
Petronius et al., U.S. Appl. No. 61/300,465 "Integrated Photonics Module for Optical Projection" filed Feb. 2, 2010.
Mor et al., U.S. Appl. No. 12/762,373 "Synchronization of Projected Illumination with Rolling Shutter of Image Sensor" filed Apr. 19, 2010.
Lavoie et al., "3-D Object Model Recovery From 2-D Images Using Structured Light", IEEE Transactions on Instrumentation and Measurement, vol. 53, No. 2, pp. 437-443, Apr. 2004.
Chinese Application # 200780016625.5 Office Action dated May 12, 2011.
U.S. Appl. No. 11/899,542 Office Action dated Apr. 4, 2011.
U.S. Appl. No. 11/724,068 Office Action dated Mar. 1, 2011.
Chinese Application # 200780009053.8 Office Action dated Mar. 10, 2011.
Japanese Application # 2008535179 Office Action dated Apr. 1, 2011.
Kun et al., "Gaussian Laser Beam Spatial Distribution Measurement by Speckles Displacement Method", HICH Power Laser and Particle Beams, vol. 12, No. 2, Apr. 2000.
Engfield, N., "Use of Pseudorandom Encoded Grid in U.S. Appl. No. 11/899,542", Andrews Robichaud, Jun. 22, 2011.
U.S. Appl. No. 61/471,215, filed Apr. 4, 2011.
Chinese Patent Application # 200680038004.2 Official Action dated Aug. 3, 2011 (English translation).
International Application PCT/IB2011/053560 filed on Aug. 10, 2011.
U.S. Appl. No. 61/419,891, filed Dec. 6, 2010.
U.S. Appl. No. 61/415,352, filed Nov. 19, 2010.
Chinese Patent Application # 200780006560.6 Official Action dated Oct. 11, 2010.
International Application PCT/IB2010/053430 Search Report dated Dec. 28, 2010.
Scharstein et al., "High-Accuracy Stereo Depth Maps Using Structured Light", IEEE Proceedings of the Conference on Computer Vision and Pattern Recognition, pp. 165-171, Jun. 18, 2003.
Koschan et al., "Dense Depth Maps by Active Color Illumination and Image Pyramids", Advances in Computer Vision, pp. 137-148, Springer 1997.
Marcia et al., "Fast Disambiguation of Superimposed Images for Increased Field of View", IEEE International Conference on Image Processing, San Diego, USA, Oct. 12-15, 2008.
U.S. Appl. No. 12/844,864 "Depth Mapping Based on Pattern Matching and Stereoscopic Information" filed Jul. 28, 2010.
Microvision Inc., "Micro-Electro-Mechanical System (MEMS) Scanning Mirror", years 1996-2009.
U.S. Appl. No. 61/372,729 "Scanning projectors for 3D mapping" filed Aug. 11, 2010.
U.S. Appl. No. 61/425,788 "Scanning projectors and image capture modules" filed Dec. 22, 2010.
U.S. Appl. No. 61/415,352 "Depth mapping using time-coded illumination" filed Nov. 19, 2010.
U.S. Appl. No. 61/419,891 "Lens Arrays for Pattern Projection and Imaging" filed Dec. 6, 2010.
U.S. Appl. No. 61/309,000 "Commitment-Based Resource Allocation for 3D Mapping" filed Mar. 1, 2010.
Btendo, "Two Uni-axial Scanning Mirrors Vs One Bi-axial Scanning Mirror", Kfar Saba, Israel, Aug. 13, 2008.
International Application No. PCT/IB2010/053430 Search Report dated Dec. 28, 2010.
Chinese Patent Application # 200680038004.2 Official Action dated Dec. 24, 2010.
Yao Kun et al., "Measurnnent of Space Distribution of Laser Gaussian Beam by Speckles Displacement Method", High Power Laser and Particle Beams, vol. 12, No. 2, pp. 141-144, Apr. 30, 2000.
Zhu et al., "Fusion of time-of-flight depth and stereo for high accuracy depth maps", Proceedings of the IEEE Conference on Computer Vision and Pattern Recognition, pp. 1-8, Jun. 23, 2008.
Koschan et al., "Dense Depth Maps by Active Color Illumination and Image Pyramids", Advances in Computer Vision, pp. 137-148, 1997.
Scharstein et al., "High-Accuracy Stereo Depth Maps Using Structured Light", IEEE Proceedings of the Computer Society Conference on Computer Vision and Pattern Recognition, pp. 165-171, Jun. 18, 2003.
Korean Patent Application # 10-2008-7025030 Office Action dated Feb. 25, 2013.
U.S. Appl. No. 12/707,678 Office Action dated Feb. 26, 2013.
U.S. Appl. No. 12/844,864 Office Action dated Apr. 11, 2013.
Japanese Patent Application # 2011-517308 Office Action dated Jun. 19, 2013.
U.S. Appl. No. 13/036,023 Office Action dated Jul. 17, 2013.
U.S. Appl. No. 12/707,678 Office Action dated Jun. 20, 2013.
International Application PCT/IB2013/051189 Search Report dated Jun. 18, 2013.
U.S. Appl. No. 13/036,023 Office Action dated Sep. 3, 2013.
Japanese Patent Application # 2011-517308 Official Action dated Dec. 5, 2012.
U.S. Appl. No. 12/844,864 Official Action dated Dec. 6, 2012.
U.S. Appl. No. 13/036,023 Official Action dated Jan. 7, 2013.
U.S. Appl. No. # 12/844,864, Office Action dated Sep. 26, 2013.
U.S. Appl. No. # 13/921,224, Office Action dated Oct. 3, 2013.
U.S. Appl. No. # 12/958,427, Office Action dated Nov. 22, 2013.

* cited by examiner

THREE-DIMENSIONAL MAPPING AND IMAGING

CROSS-REFERENCE TO RELATED APPLICATIONS

This application claims the benefit of U.S. Provisional Patent Application 61/169,728, filed Apr. 16, 2009, and of U.S. Provisional Patent Application 61/171,087 filed Apr. 21, 2009, both of which are incorporated herein by reference.

FIELD OF THE INVENTION

The present invention relates generally to mapping of an object in three dimensions, and specifically to combining such mapping and imaging functions.

BACKGROUND OF THE INVENTION

Various methods are known in the art for optical three-dimensional (3D) mapping, i.e., generating a 3D profile of the surface of an object by processing an optical image of the object. This sort of 3D profile is also referred to as a depth map or depth image, and 3D mapping is also referred to as depth mapping. Some methods of 3D mapping are based on projecting patterned light onto the object, and then analyzing an image of the pattern on the object. The pattern may be random or quasi-random, or it may alternatively have a well-defined geometrical structure (commonly known as "structured light").

One type of patterned light that may be used in depth mapping is a speckle pattern. For example, PCT International Publication WO 2007/043036, whose disclosure is incorporated herein by reference, describes a system and method for object reconstruction in which a coherent light source and a generator of a random speckle pattern project onto the object a coherent random speckle pattern. An imaging unit detects the light response of the illuminated region and generates image data. Shifts of the pattern in the image of the object relative to a reference image of the pattern are used in real-time reconstruction of a 3D map of the object. Further methods for 3D mapping using speckle patterns are described, for example, in PCT International Publication WO 2007/105205, whose disclosure is also incorporated herein by reference.

Other methods of optical 3D mapping project different sorts of patterns onto the object to be mapped. For example, PCT International Publication WO 2008/120217, whose disclosure is incorporated herein by reference, describes an illumination assembly for 3D mapping that includes a single transparency containing a fixed pattern of spots. A light source transilluminates the transparency with optical radiation so as to project the pattern onto an object. An image capture assembly captures an image of the pattern on the object, and the image is processed so as to reconstruct a 3D map of the object.

U.S. Patent Application Publication 2010/0007717, which is assigned to the assignee of the present patent application and whose disclosure is incorporated herein by reference, describes a device having a first input port for receiving color image data from a first image sensor and a second input port for receiving depth-related image data from a second image sensor. Processing circuitry generates depth maps using the depth-related image data, and then registers and synchronizes the depth maps with the color images.

The description above is presented as a general overview of related art in this field and should not be construed as an admission that any of the information it contains constitutes prior art against the present patent application.

SUMMARY

Embodiments of the present invention that are described hereinbelow provide devices and methods that may be used to generate concurrently color images and depth maps of a scene.

There is therefore provided, in accordance with an embodiment of the present invention, imaging apparatus, including an illumination subassembly, which is configured to project onto an object a pattern of monochromatic optical radiation in a given wavelength band. An imaging subassembly includes an image sensor, which is configured both to capture a first, monochromatic image of the pattern on the object by receiving the monochromatic optical radiation reflected from the object and to capture a second, color image of the object by receiving polychromatic optical radiation, and to output first and second image signals responsively to the first and second images, respectively. A processor is configured to process the first and second signals so as to generate and output a depth map of the object in registration with the color image.

Typically, the given wavelength band of the monochromatic optical radiation includes an infrared (IR) band, which may have a bandwidth that is no greater than 20 nm. In a disclosed embodiment, the imaging subassembly includes an IR bandpass filter, which is configured to inhibit IR radiation that is outside the given wavelength band from reaching the image sensor.

In disclosed embodiments, the image sensor includes an array of detector elements, and the imaging subassembly includes a mosaic filter including a pattern of filter elements overlaid respectively on the detector elements. In some embodiments, the filter elements include first filter elements configured to pass different, respective polychromatic wavelength bands, and second filter elements configured to pass the given wavelength band of the monochromatic optical radiation, wherein the first image signal is generated by the detector elements that are overlaid by the first filter elements, while the second image signal is generated by the detector elements that are overlaid by the second filter elements. Typically, the first filter elements include red, green and blue filter elements, and the second filter elements include infrared (IR) filter elements, which are interleaved with the first filter elements in a rectilinear pattern.

In other embodiments, the filter elements include at least first, second and third filter elements, which are interleaved in the pattern and are configured to pass different, respective first, second and third polychromatic wavelength bands and are also configured pass the given wavelength band of the monochromatic radiation.

In some embodiments, the image sensor is configured to output the first and second image signals in respective first and second image frames in an alternating sequence, and the illumination subassembly is configured to project the pattern during the first image frames but not during the second image frames. Typically, the frames have a given frame duration, and the imaging subassembly includes a shutter, which is configured to limit an exposure period of the image sensor to less than half of the frame duration during the first image frames, and the illumination subassembly is configured to project the pattern in a pulse that is synchronized with the exposure period.

In a disclosed embodiment, the imaging subassembly is configured to capture a third image representative of a background radiation level in the given wavelength band, and wherein the processor is configured to subtract the third image from the first image in order to generate the depth map.

There is also provided, in accordance with an embodiment of the present invention, a method for imaging, including projecting onto an object a pattern of monochromatic optical radiation in a given wavelength band. An image sensor captures both a first, monochromatic image of the pattern on the object by receiving the monochromatic optical radiation reflected from the object and a second, color image of the object by receiving polychromatic optical radiation, and outputs first and second image signals responsively to the first and second images, respectively. The first and second signals are processed so as to generate a depth map of the object in registration with the color image.

The present invention will be more fully understood from the following detailed description of the embodiments thereof, taken together with the drawings in which:

DETAILED DESCRIPTION OF EMBODIMENTS

Overview

In many applications, it is necessary or at least desirable to capture both a 3D depth map and a 2D color image of a scene of interest. For example, in a gesture-based computer interface, the computer may use both the depth map and the color image in sensing and interpreting user gestures, as well as in presenting images to the user on the computer display screen. In systems that use pattern-based depth mapping with color imaging, at least two image sensors are typically required: one to capture images of the pattern (which may be projected using infrared radiation), and the other to capture color images. The above-mentioned US 2010/0007717 describes a system of this sort, in which a processing circuit registers the depth maps with the color images.

Embodiments of the present invention, on the other hand, provide systems and methods for capturing depth maps and color images concurrently using a single image sensor. In these systems, an illumination subassembly projects a pattern of monochromatic optical radiation onto an object. The term "monochromatic" is used broadly, in the context of the present patent application and in the claims, to refer to radiation in a band of wavelengths that is substantially narrower than the full polychromatic range of visible light. Thus, the monochromatic radiation typically has a bandwidth that is no more than 100 nm at full-width-half-maximum (FWHM). The wavelength band of the monochromatic pattern is typically chosen to be in the infrared (IR) so as to avoid interfering with the color imaging function and to avoid visual disturbance to the user. The wavelength band of the monochromatic radiation may be considerably narrower than 100 nm, for example, 20 nm or less, in order to facilitate the use of narrowband filters to separate the monochromatic radiation from the ambient radiation (and particularly from wideband ambient IR radiation).

The image sensor captures both monochromatic images of the pattern on the object (due to the monochromatic radiation reflected from the object) and color images of the object (due to reflection of ambient light or other visible lighting from the object). Although the same image sensor captures both images, it outputs separate monochrome and color image signals.

In some embodiments, the separation is achieved by temporal multiplexing, whereby the image sensor outputs monochrome and color image frames in an alternating sequence. In such embodiments, the illumination subassembly projects the monochromatic pattern during the monochrome image frames but not during the color image frames.

In other embodiments, the separation is achieved by spatial multiplexing. In these embodiments, the array of detector elements of the image sensor is overlaid by a mosaic array of filter elements, which includes both color filter elements (such as red, green and blue) for the detector elements used in sensing the color image and monochromatic filter elements (typically IR) for the detector elements that sense the projected pattern.

A processor receives and processes the signals output by the image sensor so as to generate and output both the depth maps and the color images. The use of a single image sensor for both functions reduces the cost, size and complexity of the system, while at the same time ensuring that the depth maps are perfectly registered with the color images.

System Description

Figure 1:
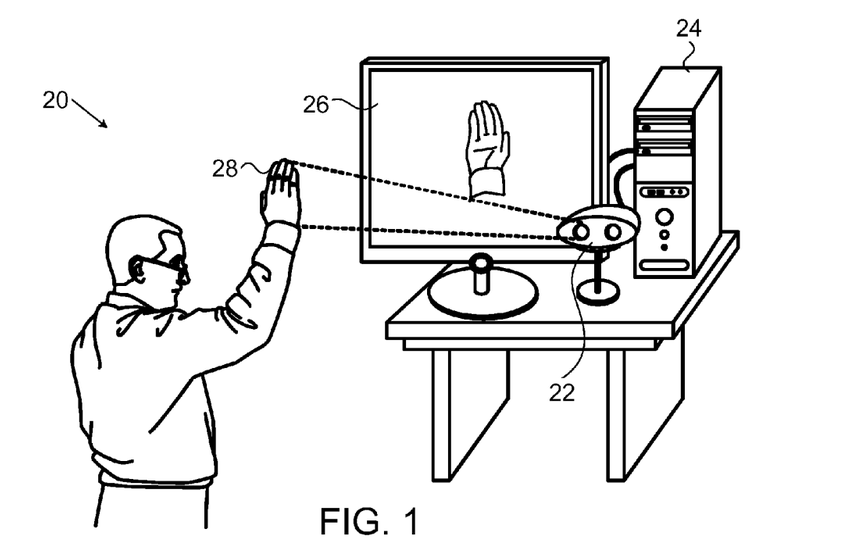
FIG. 1 is a schematic pictorial illustration of a system for 3D mapping and imaging, in accordance with an embodiment of the present invention.

FIG. 1 is a schematic, pictorial illustration of a system 20 for 3D mapping and imaging, in accordance with an embodiment of the present invention. In this example, an imaging assembly 22 is configured to capture and process 3D maps and images of an object 28 (in this case the hand of a user, who may also be the operator of the system). The maps and images may be used by a host computer console 24 as part of a 3D user interface, presented on a display 26, which enables the user to interact by means of gestures with games and other applications running on the computer. (This sort of functionality is described, for example, in U.S. Patent Application Publication 2009/0183125, whose disclosure is incorporated herein by reference.) This particular application of system 20 is shown here only by way of example, however, and the mapping and imaging capabilities of system 20 may be used for other purposes, as well, and applied to substantially any suitable type of 3D object.

In the example shown in FIG. 1, imaging assembly 22 projects a pattern of optical radiation onto the body (or at least parts of the body) of the user, and captures an image of the pattern that appears on the body surface. The term "optical radiation," as used in the context of the present patent application and in the claims, refers to any of ultraviolet, visible, and/or IR radiation. In the present embodiment, the radiation that is projected by assembly 22 is narrowband radiation in the IR range, but other wavelength bands may alternatively be used.

A processor in assembly 22, whose functionality is described in greater detail hereinbelow, processes the image of the pattern in order to generate a depth map of the body. The depth map comprises an array of 3D coordinates, including a depth (Z) coordinate value of the body surface at each point (X,Y) within a predefined field of view. (In the context of an array of image-related data, these (X,Y) points are also referred to as pixels.) In the embodiments that are described hereinbelow, the processor computes the 3D coordinates of points on the surface of the user's body by triangulation, based on transverse shifts of spots in the pattern, as described in the above-mentioned PCT publications WO 2007/043036, WO 2007/105205 and WO 2008/120217. This technique is referred to herein as "pattern-based depth mapping."

In addition, imaging assembly 22 captures 2D color images of the user. The 2D color images are inherently registered and synchronized with the depth maps, thus providing the basis to reconstruct a 3D color image of the user. Assembly 22 generates a data stream that includes the depth maps and image data for output to computer console 24.

Figure 2:
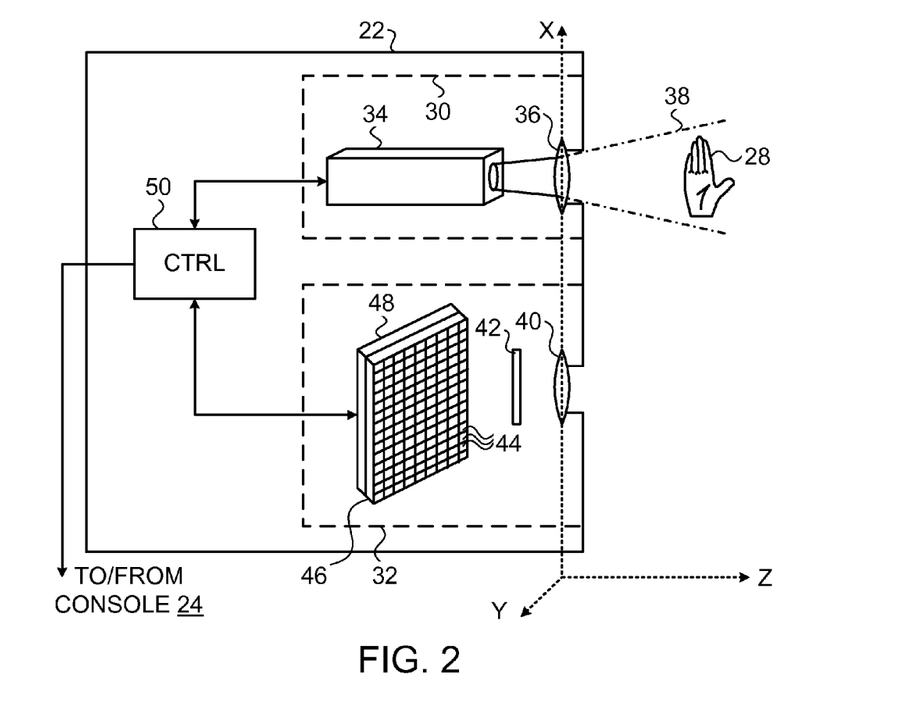
FIG. 2 is a schematic top view of an imaging assembly, in accordance with an embodiment of the present invention.

FIG. 2 is a schematic top view of imaging assembly 22, in accordance with an embodiment of the present invention. Here the X-axis is taken to be the horizontal direction along the front of assembly 22, the Y-axis is the vertical direction (out of the page in this view), and the Z-axis extends away from assembly 22 in the general direction of the object being imaged by the assembly.

For 3D mapping, an illumination subassembly 30 illuminates the object with an appropriate pattern, such as a speckle pattern. For this purpose, subassembly 30 typically comprises a suitable radiation source 34, such as a diode laser, light-emitting diode (LED) or other light source, along with optics for creating the pattern. The optics may comprises, for example, a diffuser, a diffractive optical element, a microlens array, or another sort of transparency, as described in the above-mentioned PCT publications. As noted above, radiation source 34 typically emits monochromatic IR radiation in a narrow band, although other radiation bands, in the visible or ultraviolet range, for example, may also be used. Projection optics 36 projects the pattern in a beam 38 onto object 28.

An image capture subassembly 32 captures images of the pattern on the surface of object 28 and also captures color images of the object. Subassembly 32 typically comprises objective optics 40, which image the object surface onto an image sensor 48, such as a CMOS or CCD image sensor. The image sensor comprises an array of detector elements overlaid by a mosaic filter 46, which comprises an array of filter elements 44 aligned with respective detector elements. Features of this mosaic filter are described further hereinbelow. To enhance the contrast of the images captured by image sensor 48, a bandpass filter 42 may be used to block ambient IR radiation, while passing only visible light and the IR wavelength band of radiation source 34. Alternatively, mosaic filter elements 44 may also be configured to perform this IR bandpass filtering function. Typically, subassembly 32 comprises one or more mechanisms for adapting its image capture function to the intensity of the light reflected from the object including, for example, an electronic or mechanical shutter, automatic gain control (AGC), and/or a variable iris.

A control processor 50 controls the timing and other functions of subassemblies 30 and 32, and also receives and processes image signals from subassembly 32. Processor 50 typically comprises an embedded microprocessor, which is programmed in software (or firmware) to carry out the processing functions that are described hereinbelow. The software may be provided to the processor in electronic form, over a network, for example; alternatively or additionally, the software may be stored on tangible computer-readable media, such as optical, magnetic, or electronic memory media. Processor also comprises suitable input and output interfaces and may comprise dedicated and/or programmable hardware logic circuits for carrying out some or all of its functions. Details of some of these processing functions and circuits that may be used to carry them out are presented in the above mentioned U.S. Patent Application Publication 2010/0007717.

Briefly put, processor 50 compares the monochrome images provided by subassembly 32 to a reference image of the pattern projected by subassembly 30 onto a reference plane at a known distance from assembly 22. (The reference image may be captured as part of a calibration procedure and stored in a memory, for example.) The processor matches the local patterns in the captured image to those in the reference image and thus finds the transverse shift for each pixel, or group of pixels, within the plane. Based on these transverse shifts and on the known distance between the optical axes of subassemblies 30 and 32, the processor computes a depth (Z) coordinate for each pixel and thus creates a depth map. In addition, as noted above, processor 50 processes the color image signals from image sensor 48 to produce color images in registration with the depth maps. Processor 50 outputs the depth and color image data via a port, such as a USB port, to console 24.

Alternatively, other system configurations may be used for the purposes described herein and are considered to be within the scope of the present invention. For example, image capture subassembly 32 may comprise multiple image sensors. As another example, processor 50 may output raw data received from image sensor 48, and the processing functions described above may be carried out by an external computer, such as console 24.

Time Multiplexing of Depth Maps and Color Images

In some embodiments of the present invention, filter comprises standard polychromatic mosaic filter, such as a Bayer red-green-blue (RGB) mosaic filter. In this sort of filter, there are three different types of filter elements 44, arranged in a rectilinear pattern, which filter the optical radiation to be received by the image sensor by passing different, respective visible wavelength bands, for example:

| R | G | R | G | ... |
| G | B | G | B | ... |
| R | G | R | G | ... |
| G | B | G | B | ... |
| ... | ... | ... | ... | ... |

The filter elements, however, also tend to pass IR radiation, including the IR wavelength band of the monochromatic radiation. (For example, see the spectral response curves of the KAC-9628 image sensor, produced by Eastman Kodak Image Sensor Solutions, Rochester, N.Y.) In conventional cameras, an additional IR cutoff filter in front of the image sensor prevents IR radiation from reaching the detector elements, and thus compensates for the relative transparency of the mosaic filter elements in the IR.

In the present embodiment, however, bandpass filter 42 permits IR radiation in the narrow wavelength band of radiation source 34 to reach image sensor 48, in addition to visible light. In this embodiment, it is desirable that the filter bandwidth be as narrow as possible, in order to limit the amount of ambient IR radiation that passes through to the image sensor. Furthermore, controller 50 drives radiation source 34 in an intermittent, pulsed mode, in a way that minimizes IR interference with the color image, as described below.

Figure 3:
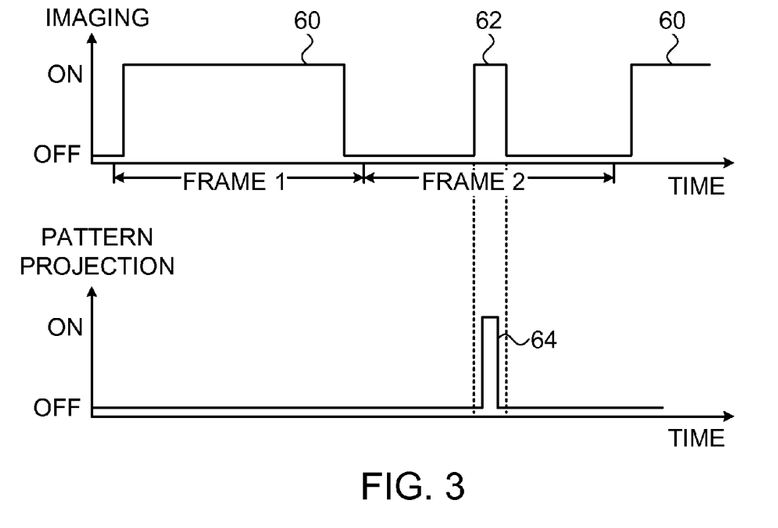
FIG. 3 is a timing diagram that schematically illustrates operation of illumination and imaging components in a system for 3D mapping and imaging, in accordance with an embodiment of the present invention.

FIG. 3 is a timing diagram that schematically illustrates operation of illumination subassembly 30 and imaging subassembly 32 in this embodiment. The upper plot illustrates the operation of image sensor 48 over a sequence of standard image frames. The image sensor captures and outputs color images in the odd-numbered frames (FRAME 1, FRAME 3, . . . ), interleaved in alternation with IR pattern images in the even-numbered frames (FRAME 2, FRAME 4, . . . ). Alternatively, other interleaving ratios may be used and may, for example, provide a larger proportion of color frames or of IR frames in the sequence.

In each frame, the detector elements of the image sensor capture light and integrate photoelectrons over an exposure period 60 or 62. The exposure period is controlled by a shutter, such as electronic shutter integrated with the image sensor, as is known in the art. Exposure period 60 is variable, depending on the level of visible light, and may be nearly as long as the frame duration, as shown in FIG. 3. Exposure period 62 in the IR frames, however, is typically less than half the frame duration, and may be considerably shorter.

The lower plot in FIG. 3 illustrates the operation of radiation source 34, under the control of processor 50. The radiation source is turned off during the color image frames, so that the pattern is not projected during these frames, and the only IR radiation reaching image sensor 48 is ambient radiation within the passband of filter 42. Processor 50 drives radiation source 34 to emit a pulse 64 of IR radiation during each IR frame, in synchronization with exposure period 62. Because the shuttered exposure period and IR pulse are short, relative to the frame duration, image sensor 48 captures relatively little ambient IR radiation, and the signal/background ratio of the pattern images is enhanced.

To reduce the effect of ambient light still further, it is possible to capture an ambient light image while the patterned IR radiation is off, which is representative of the background IR radiation level. This ambient light image can be subtracted from the IR pattern image in order to gain additional enhancement of the signal/background ratio.

Thus, processor 50 receives an interleaved sequence of alternating color and IR image frames. It processes the IR frames, as described above, in order to detect the pattern of the IR radiation reflected from object 28 and thus to create a depth map of the object. Because the color images and depth maps are created using the same image sensor and optics, they are inherently aligned without requiring any further adjustment by the processor. The processor thus outputs an alternating sequence of color images and depth maps or, alternatively, a sequence of frames in which the pixels have both color and depth values.

Spatial Multiplexing of Depth and Color Image Capture

Figure 4:
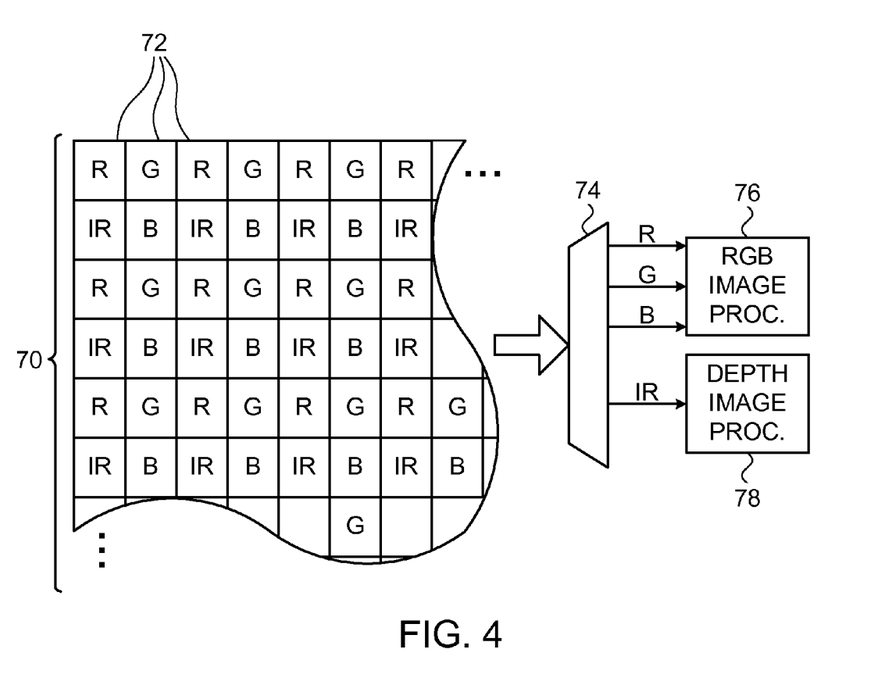
FIG. 4 is a block diagram that schematically illustrates components of an imaging assembly, in accordance with an alternative embodiment of the present invention.

FIG. 4 is a block diagram that schematically illustrates components of imaging assembly 22, in accordance with an alternative embodiment of the present invention. In this embodiment, image sensor 48 has a mosaic filter 70 with a non-standard arrangement of filter elements 72: The filter includes IR filter elements interleaved with the three types of polychromatic (R, G and B) filter elements. These IR filter elements may, for example, take the place of one of the two green elements in each group of four filter elements in the standard Bayer layout shown above. The IR filter elements are designed to pass IR radiation in the wavelength band emitted by radiation source 34. It is desirable in this embodiment, too, that filter 42 pass visible light and only the wavelength band of radiation source 34 in the IR range. It is also desirable that the R, G and B filter elements block IR radiation, in contrast, for example, to conventional mosaic filter elements used in devices such as the Kodak image sensor described above.

A switching circuit 74, which may be integrated into the image sensor chip or processor 50, or may comprise a separate component, demultiplexes the IR pixels from the R, G and B pixels. Thus, in effect, the image sensor simultaneously outputs a color image and an IR pattern image in each frame. Processor 50 comprises a RGB image processor 76, which combines the color pixels into a color output image, and a depth image processor 78, which generates a depth map based on the IR pixels. The resolution of the color image and of the depth map may be lower than those achieved by the preceding embodiment, but on the other hand, the color images and depth maps are both output at the full frame rate of the image sensor.

As another alternative (not shown in the figures), the mosaic filter may include an additional set of IR filter elements, having a passband of similar width to that of the IR filter elements that capture the patterned radiation, but offset from the wavelength of the IR radiation source. The detector elements associated with these additional IR filter elements thus capture an IR background image, with intensity close to the intensity of the ambient background in the IR pattern image. This background image may then be subtracted from the pattern image in order to enhance the signal/background ratio.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Imaging apparatus, comprising:
an illumination subassembly, which is configured to project onto an object a pattern of monochromatic optical radiation in an infrared (IR) wavelength band;
an imaging subassembly comprising:
an image sensor, which comprises an array of detector elements and is configured to capture:
a first, monochromatic image of the pattern on the object by receiving the monochromatic optical radiation reflected from the object;
a second, color image of the object by receiving polychromatic optical radiation; and
a third image representative of an ambient background radiation level in the IR wavelength band exclusive of the projected pattern, and
to output first, second and third image signals responsively to the first, second and third images, respectively; and
a mosaic filter comprising a pattern of filter elements overlaid respectively on the detector elements, wherein the filter elements comprise second filter elements configured to pass different, respective visible wavelength bands, and first filter elements configured to pass the IR band of the monochromatic optical radiation, and
wherein the first and third image signals are generated by the detector elements that are overlaid by the first filter elements, while the second image signal is generated by the detector elements that are overlaid by the second filter elements; and a processor, which is configured to process the first, second and third signals so as to generate and output a depth map of the object in registration with the color image, wherein the depth map is generated by subtracting the third image signals from the first image signals to produce a difference signal, and processing the difference signal in order to generate the depth map.

2. The apparatus according to claim 1, wherein the IR wavelength band has a bandwidth that is no greater than 20 nm.

3. The apparatus according to claim 1, wherein the first filter elements comprise red, green and blue filter elements, and the second filter elements comprise infrared (IR) filter elements, which are interleaved with the first filter elements in a rectilinear pattern.

4. A method for imaging, comprising:

projecting onto an object a pattern of monochromatic optical radiation in an infrared (IR) wavelength band;

capturing, using an image sensor, which comprises an array of detector elements, both a first, monochromatic image of the pattern on the object by receiving the monochromatic optical radiation reflected from the object and a second, color image of the object by receiving polychromatic optical radiation, wherein capturing the first and second images comprises filtering the optical radiation impinging on the image sensor using a mosaic filter, which comprises a pattern of filter elements overlaid respectively on the detector elements, wherein the filter elements comprise second filter elements configured to pass different, respective visible wavelength bands, and first filter elements configured to pass the IR wavelength band of the monochromatic optical radiation;

capturing, using the image sensor, a third image representative of a background radiation level in the IR wavelength band exclusive of the projected pattern, and outputting a third image signal responsively to the third image;

outputting from the image sensor first, second and third image signals responsively to the first, second and third images, respectively, wherein the first and third image signals are generated by the detector elements that are overlaid by the first filter elements, while the second image signal is generated by the detector elements that are overlaid by the second filter elements; and processing the first, second and third signals so as to generate a depth map of the object in registration with the color image, wherein the depth map is generated by subtracting the third image signals from the first image signals to produce a difference signal, and processing the difference signal in order to generate the depth map.

5. The method according to claim 4, wherein the IR wavelength band has a bandwidth that is no greater than 20 nm.

6. The method according to claim 4, wherein the first filter elements comprise red, green and blue filter elements, and the second filter elements comprise infrared (IR) filter elements, which are interleaved with the first filter elements in a rectilinear pattern.

* * * * *